United States Patent [19]
Render et al.

[11] Patent Number: 5,907,654
[45] Date of Patent: May 25, 1999

[54] PRINTED CIRCUIT BOARD FOR CONNECTION TO AN OPTICAL FIBER

[75] Inventors: David Stephen John Render, Belleville; Eric MacDonald, Carrying Place; Stephen Macklin, Belleville, all of Canada

[73] Assignee: Northern Telecom Limited, Montreal, Canada

[21] Appl. No.: 08/910,271

[22] Filed: Aug. 13, 1997

[51] Int. Cl.⁶ ............................................. G02B 6/36
[52] U.S. Cl. ............................................. 385/135
[58] Field of Search ............................ 385/135, 134, 385/53

[56] References Cited

U.S. PATENT DOCUMENTS

| | | | |
|---|---|---|---|
| 4,792,203 | 12/1988 | Nelson et al. | 385/135 |
| 4,861,134 | 8/1989 | Alameel et al. | 385/135 |
| 5,021,211 | 6/1991 | Hunsbedt et al. | 376/299 |
| 5,067,784 | 11/1991 | Debortoli et al. | 385/53 |
| 5,337,400 | 8/1994 | Morin et al. | 385/135 |
| 5,353,367 | 10/1994 | Czosnowski et al. | 385/135 |
| 5,442,725 | 8/1995 | Peng | 385/135 |
| 5,442,726 | 8/1995 | Howard et al. | 385/135 |
| 5,469,526 | 11/1995 | Rawlings | 385/135 |
| 5,689,606 | 11/1997 | Hassan | 385/135 |
| 5,703,991 | 12/1997 | Izumi | 385/135 |

*Primary Examiner*—John D. Lee
*Assistant Examiner*—Juliana K. Kang
*Attorney, Agent, or Firm*—R.J. Austin; Jean-Pierre Fortin

[57] ABSTRACT

A structure of a printed circuit board and a fiber storage holder for accommodating a superfluous length of fiber to be connected to a terminal on the printed circuit board. This structure if for use with the board mounted within an electronic shelf and solely accommodates superfluous lengths of fiber with pre-specified lengths. To enable removal of the printed circuit board from its shelf, free fiber is necessary. This is accommodated by a fiber storage facility which is additional to the holder. The fiber storage facility is located outside the printed circuit board receiving chamber of the shelf and is preferably attached to a shelf wall, e.g. a bottom wall, so as to store a removable length portion of fiber. Upon removal, the removable length portion provides a free fiber length which, by flexing, allows for removal from and return to the shelf of the printed circuit board. The fiber may extend between two printed circuit boards mounted in the same or separate shelves with each printed circuit board having its own fiber storage facility. It is necessary for only one of the printed circuit boards to have a fiber storage holder.

10 Claims, 5 Drawing Sheets

PRINTED CIRCUIT BOARD FOR CONNECTION TO AN OPTICAL FIBER

This invention relates to printed circuit boards for connection to optical fibers.

In the electronics industry, particularly in the telecommunications industry, it is common practice to use housing structures known as shelves for accommodating printed circuit boards in their operational positions. These boards have face plates which together with the boards form circuit packs with each circuit pack comprising one or more printed circuit boards. The circuit packs are normally slidably moveable into and out of the shelves and, in their operational positions, the boards are disposed in side by side relationship within the shelves.

With the above structures and where electrical conductors are used for power and signal transmission purposes, each printed circuit board is interconnected with other boards by means of a back plane with electrical interconnection being made by each board with the back plane by means of mating electrical connectors between the back plane and rear edge regions of the boards. Other electrical connections may be made to individual boards by means of electrical conductors which are directed to the front edge regions of the boards for interconnection with front edge connectors. Hence, the use solely of electrical conductors for shelf arrangements of printed circuit boards is now considered to be largely satisfactory.

However steps are currently being entertained for replacing at least certain electrical conductors with optical fiber conductors. In particular, it is envisaged that with printed circuit boards in their operational positions and interconnected into back planes, certain printed circuit boards should be connected to optical fiber conductors which bypass the back planes, and an optical conductor may, for example, extend directly between two printed circuit boards which may be mounted in different shelves. Such an arrangement would include an optical fiber conductor between a master printed circuit board in a master shelf and a slave printed circuit board in a slave shelf.

For various reasons it can be seen that it is not a simple matter merely to replace an electrical conductor with an optical fiber conductor following the same path as the electrical conductor. Firstly, it may not be considered to be good engineering practice to locate optical fibers at the fronts of shelves to be connected into front edge regions of printed circuit boards, because optical fibers, whether protected or not, are extremely vulnerable to damage when mishandled. In addition, when located at front edges of shelves, there is a possibility that optical fibers may be caused to bend at certain positions around an arc having a bend radius less than that deemed advisable in their use. Any damage to an optical fiber while bending it to such a small radius is likely to cause unacceptable attenuation to signals passing along the fiber. Also while electrical conductors are easily connectable into connectors while being provided with precisely their required lengths, it is more difficult to connect optical fibers into connectors in the field and while glass fibers may be spliced in the field, it is not possible at this time to splice plastic optical fibres in the field. As a result, optical fibers and plastic optical fibers in particular, are normally factory assembled with optical connectors at both ends with the fibers in specified lengths. Hence, in use of optical fibers, superfluous lengths of fiber are almost always present and these lengths present storage and management problems.

In addition, it will be necessary with printed circuit boards mounted in shelves and employing the use of ingoing and outgoing optical fibers, to initially insert the printed circuit boards into their operational positions and to allow for their subsequent removal for maintenance or repair purposes and for their subsequent replacement. One theoretical way of permitting such printed circuit board movement is to manually reach and disconnect the optical connections to the printed circuit boards with a printed circuit board in its operational position. This theoretical method seems to be fraught with manual access problems and may be impractical. Apart from the practical access problems associated with connection and disconnection of optical connectors with the board in its operational position, optical fiber disconnection will prevent any signal testing operation to be performed along the fiber when a printed circuit board has been removed from its shelf. Hence, it is recognised that for all practical purposes an ingoing or outgoing optical fiber must be maintained connected to its printed circuit board while in its shelf and during and after removal from the shelf. Thus, efficient optical fiber management is needed to permit the required printed circuit board movement to take place with accompanying fiber flexure and without endangering the fiber. For this purpose, stored and managed lengths of fiber are required with the printed circuit board in its operational position. It has, for many years, been recognised that optical fibers may be managed by forming them into convolutions within a prepared chamber or space which also prevents them from bending below their minimum desired radius whereby attenuation is not significantly increased. With known arrangements, the fibers are located in trays, drawers, or holders which also store excess lengths of fiber. This is illustrated by the teachings in various patents, for instance, in U.S. Pat. Nos. 4,792,203, 5,067,784, 5,021,211, 5,337,400 and 5,353,367.

In practice, with the use of ingoing or outgoing optical fibers to printed circuit boards in shelves, attempts have been made to solve fiber storage and management problems by the location of superfluous fiber lengths in the form of loops around curved fiber storage holders extending horizontally outwards from the shelf side wall. Such arrangements are extremely difficult to use because access is required to unloop the superfluous lengths to provide free fiber lengths so as to allow a printed circuit board to be removed from its operational position and to enable loops to be formed subsequently to a printed circuit board being redisposed in its operational position. Further, the fiber in being stored by the board and then being allowed to drop as a free length within the shelf is a hindrance to board movement and may become damaged. In addition, this unsightly method is untidy and presents an unsightly appearance.

The present invention seeks to provide a printed circuit board arrangement which minimizes or avoids the above problems.

According to one aspect of the present invention, there is provided a printed circuit board arrangement comprising a printed circuit board with two sides and having an optical fiber storage holder mounted upon one side of the printed circuit board, the fiber storage holder providing an endless pathway for storing a length of fiber in the form of convolutions around the pathway, the holder providing two inlets to the pathway for the fiber.

The above printed circuit board arrangement will successfully accommodate any superfluous lengths of optical fiber which are not required to extend the fiber from an optical connector on the printed circuit board to an optical connector at another location. If ready access is provided to the endless pathway to insert and remove the superfluous length of fiber with the board arrangement in its operational position within the shelf, then the superfluous length may be removed from the pathway before the printed circuit board is removed from its operational position and may be reinserted around the pathway after the printed circuit board has been disposed once again in its operational position. While this would allow for the optical fiber to be connected at both of its ends to the printed circuit board and to the other location, the movement of the fiber into and out of the endless pathway for this purpose may be a difficult and tedious operation to perform. It is preferred, therefore, to provide another storage location for receiving further convolutions of the optical fiber to enable movement of the printed circuit board into and out from the shelf. This further fiber storage should be disposed outside the shelf receiving chamber for the printed circuit board for ease of access for removal and insertion of fiber convolutions.

In a practical arrangement the fiber storage holder in the inventive arrangement comprises peripheral side walls and an end wall partially enclosing the pathway. For ease of operation, the partial enclosure of the pathway should enable the fiber to be inserted by lateral movement of fiber into the holder and into the endless pathway. It is possible however for the pathway to be designed such that fiber may be fed longitudinally into one inlet and for it to extend around the pathway for at least one convolution and emerge from the other inlet.

In a further practical structure the end wall of the holder is detachably mounted in position to the remainder of the holder. This arrangement assists in positioning the fiber within the holder with the end wall removed, the end wall subsequently being replaced for retaining purposes. This arrangement is particularly useful for location of a superfluous length of fiber within the endless pathway under controlled factory assembly conditions and before the holder is mounted on the printed circuit board. Particularly, factory assembly of the superfluous length is convenient when it is known what superfluous lengths of fiber are required to be stored when design and measurement requirements for a specific site location are previously known.

It is also convenient for the fiber storage holder to be mounted upon the printed circuit board by resiliently flexible holding latches which extend through apertures in the printed circuit board to detachably retain the holder in place on the board.

The invention further includes an electronic shelf and printed circuit board combination comprising: an electronic shelf defining a print circuit board receiving chamber; a printed circuit board received in an operational position within the printed circuit board receiving chamber; a fiber storage holder mounted upon one side mounted upon one side of the printed circuit board, the fiber storage holder defining an endless pathway for storing a superfluous length portion of fiber in the form of at least one convolution extending around the endless pathway, the holder providing a first inlet and a second inlet to the endless pathway for the fiber; an optical connector carried by the printed circuit board for connection to a mating connector carried by a first end portion of the fiber extending from the first inlet, the holder having provision to allow for insertion and removal of the superfluous length of fiber.

It follows from use of the inventive combination defined above that a specified length of optical fiber which is longer than that necessary to extend from the optical connector at the printed circuit board to a further location may be accommodated within the fiber storage holder carried conveniently by the printed circuit board. In certain constructions it may be possible for the superfluous length portion of the fiber to be removed from the fiber storage holder so that the superfluous length portion provides a free length of the fiber which will enable the printed circuit board to be removed from within the receiving chamber. In this case the printed circuit board may be disposed on a surface forwardly of the shelf for replacement, maintenance or repair purposes.

However, in a preferred arrangement, it is intended for the fiber storage holder to retain the superfluous length portion of the fiber in a substantially permanent manner while the printed circuit board is still permitted to be removed from and re-inserted into the receiving chamber. For this purpose, in the preferred arrangement, a fiber storage facility is included which is additional to the fiber storage holder. This fiber storage facility is disposed exteriorly of the printed circuit board receiving chamber and has an endless fiber storage pathway for storing a removable length portion of the fiber in the form of at least one convolution. Hence, the fiber storage facility has means to allow for removal and insertion of the removable length portion from the storage pathway, and the fiber storage facility also has a first and second entrances for the fiber into the storage pathway. The first of these entrances is oriented to receive fiber from the second inlet of the fiber storage holder while the second entrance is oriented to direct an outgoing length portion of the fiber from the storage facility to a further location. For convenience the fiber storage facility is preferably carried upon a wall of a shelf. Thus, the removable length portion of fiber may be withdrawn from the storage pathway to create a free length of the fiber outside the receiving chamber to permit removal and reinsertion of the printed circuit board into the chamber.

It is also envisaged that in the preferred arrangement the second inlet of the fiber storage holder and the first entrance of the fiber storage facility are positioned to receive the fiber when this extends around a front edge of the shelf. This provides for convenience in installation of the fiber and for insertion and removal of the printed circuit board. It is possible, however, for the fiber to be directed through an aperture in the wall of the shelf for sliding movement of the fiber through the aperture as the printed circuit board is moved into and out of its operational position.

In a further arrangement of the combination according to the invention the other location is provided within the printed circuit board receiving chamber of the same shelf by means of another printed circuit board within that chamber. With this arrangement, a further fiber storage facility is provided and is carried upon the wall of the shelf which carries the previously mentioned fiber storage facility. Thus, in this case it is intended that the fiber should extend from one fiber storage facility to the other in passing between the printed circuit boards.

Full use of the inventive combination is realized, however, where at the other location, the other printed circuit board is disposed in a further shelf which has its own printed circuit board receiving station. In this case, it is intended for the outgoing length portion of fiber to extend from the fiber storage facility to a further fiber storage facility attached to the further shelf and for containing a further removable portion of fiber to be directed to the other printed circuit board.

Embodiments of the invention will now be described, by way of example, with reference to the accompanying drawings in which.

Figure 1:
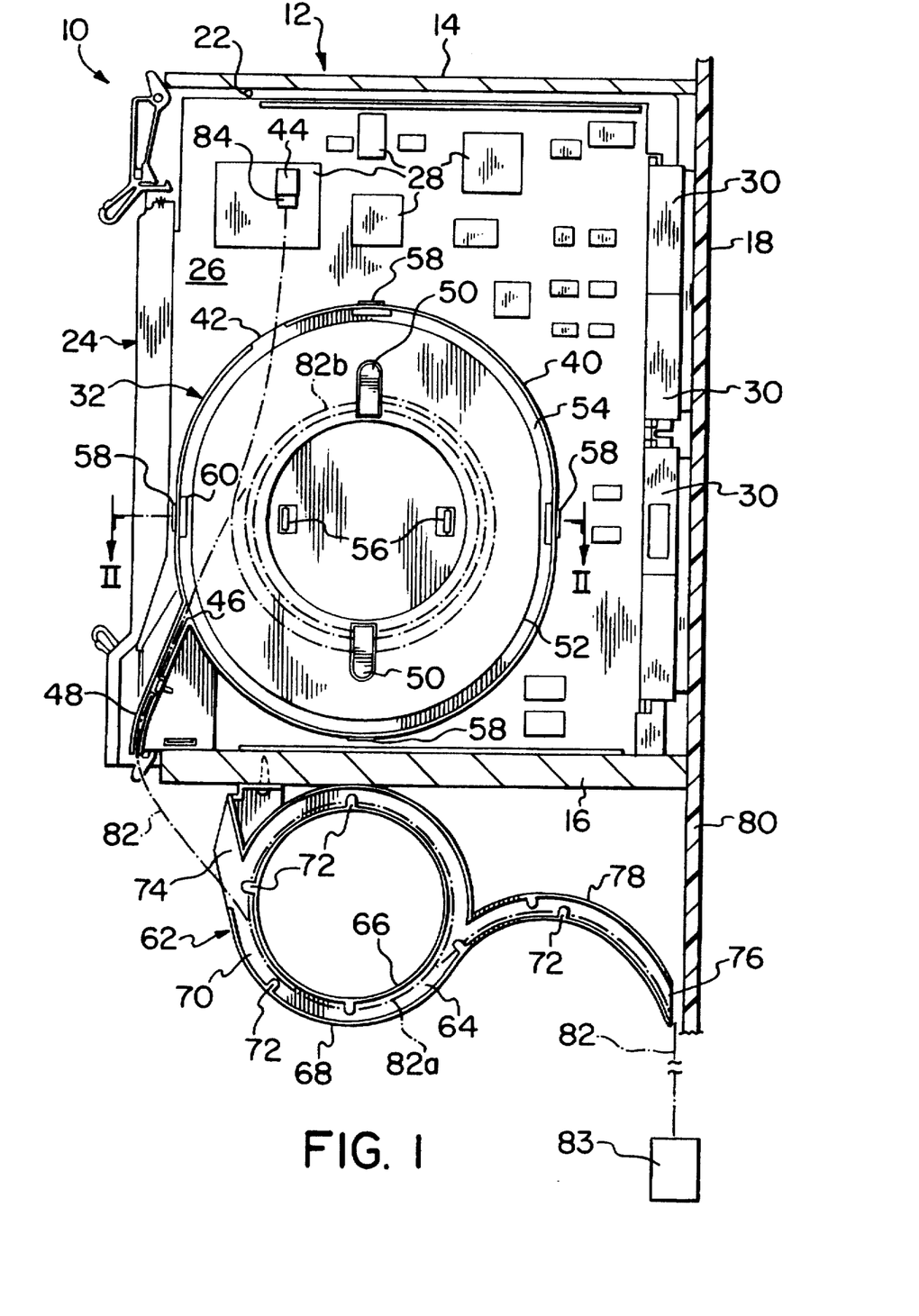
FIG. 1 is a vertical cross-sectional view through an electronic shelf and printed circuit board combination according to a first embodiment.

As shown in the first embodiment in FIG. 1, an electronic shelf and printed circuit board combination 10 comprises an electronic shelf 12 of conventional configuration and having a top wall 14, bottom wall 16 and a back plane 18 providing a rear wall of the shelf, the back plane facing an open front to the shelf. The shelf defines a printed circuit board receiving chamber 22 within which are disposed a plurality of spaced apart vertically extending printed circuit boards of conventional construction (not shown in FIG. 1) and, in addition, at least one printed circuit board arrangement 24 slidably received into the chamber 22.

Figure 2:
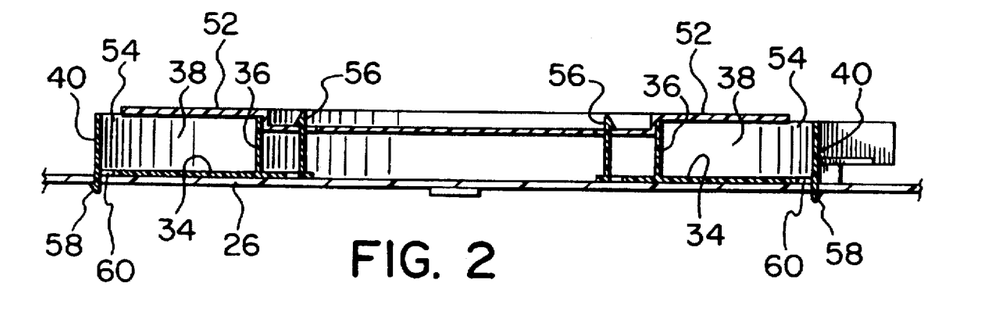
FIG. 2 is a cross-sectional view taken along line II—II in FIG. 1 and showing detail of assembly of parts of the printed circuit board of FIG. 1.

According to the invention and in this embodiment, the printed circuit board arrangement 24 comprises a printed circuit board 26 carrying surface mount components 28 and rear edge connectors 30 which connect into the back plane 18 with the printed circuit board arrangement in the operational position within the shelf. The printed circuit board arrangement 24 is intended to receive optical signals for conversion into electrical signals and for this purpose an optical fiber storage holder 32 is provided upon one side of the printed circuit board 26. The holder 32 is for containing a superfluous length portion of fiber in the form of at least one convolution and (as shown in FIG. 2) comprises a base 34, an inner endless wall 36 forming an inner boundary for an endless pathway 38 for the convolutions of fiber and an outer wall 40 forming an outer boundary to the endless pathway. The inner wall has a diameter such as to prevent the convolutions of fiber from having a diameter less than a desirable minimum diameter so as to prevent undesirable attenuation losses due to fiber curvature. The outer wall 40 is substantially continuous except for two inlets to the storage pathway 38, i.e. an upper inlet 42 to direct an end portion of fiber upwardly to an optical connector 44, mounted on the board, and a downwardly directed inlet 46 which provides one end of a fiber guide 48. The fiber guide 48 is inclined downwardly and forwardly of the arrangement 24 so as to direct a fiber from the guide around a front edge of the lower wall 16 of the shelf for reasons to be discussed below.

The inner wall also is provided with two radially outward tongues 50 for holding convolutions of fiber in position before a cover 52 is located upon the inner wall 36 for the purpose of substantially closing the pathway 38 except for a narrow gap 54 between the periphery of the cover and the wall 40. This gap enables fiber to be inserted laterally into the pathway 38 without removal of the cover should this be required. The cover is held in position to the inner wall by resilient flexible latches 56 provided upon an inner extension of the base 34. The holder 32 is detachably held to the printed circuit board 26 by four latches 58 equally spaced apart around the outer wall 40 and depending therefrom for reception through apertures 60 in the printed circuit board (FIG. 2).

As indicated above the holder 32 is for a superfluous length portion of fiber. It is useful, therefore, for accommodating superfluous length portions of fiber, the fiber being of standard manufactured lengths and which are too long for the distance to be travelled between the connector 44 and some other location at the other end of the fiber. Hence the holder 32 provides permanent protection for the superfluous length portion in use and during insertion and removal of the printed circuit board arrangement from within the shelf.

It is also necessary in the embodiment to provide a removable stored length of fiber which is protected during use of the printed circuit board arrangement within the shelf and which is available as a free length of fiber to enable the arrangement to be removed from the shelf for maintenance, repair or replacement purposes. For this purpose a fiber storage facility 62 is provided and which is located and attached beneath the lower wall 16 of the shelf. The facility 62 is U-shaped in section and has an annular base 64, a circular inner wall 66 and outer wall 68, the walls defining between them a substantially circular fibre storage pathway 70. The pathway 70 is open sided as shown in FIG. 1 and tongues 72 extend inwardly across the open side to the chamber from the inner and outer walls 66 and 68 so as to retain convolutions of fiber within the pathway 70 unless purposely removed. The fiber storage facility also includes two entrances. This includes a first entrance 74 to the pathway 70, the first entrance 74 directed upwardly and forwardly and in the direction of the lower end of the guide 48. A second entrance 76 to the chamber 70 provides one end of a downwardly curved guide 78 which is attached to a rear wall or downward extension 80 of the back plane 18 as shown in FIG. 1. This guide 78 directs fiber downwardly from the shelf so that an outgoing fiber length portion may be directed to another location.

As may be seen in use, and with reference to FIG. 1, an optical fiber 82 (shown in chaindotted in FIG. 1 for clarity) and extending from the other location 83 is directed through the guide 78 and in at least one convolution around the pathway 70 to provide a removable length portion 82a of fiber within the pathway 72. The fiber then extends from the outlet 74, passes around a front end of the base wall 16 of the shelf and enters the guide 48. The fiber then enters the pathway 38 in the holder 32 to provide one or more convolutions of a superfluous length portion 82b of fiber within the pathway 38 before exiting through the inlet 42 for connection of a connector 84 at that end portion of the fiber to the optical connector 44 on the printed circuit board. The fiber in its passage through the fiber storage facility 62 and from the outlet 74 and into the guide 48 as with other parts of the fiber, does not follow a sufficiently small radius of curvature to result in undesirable signal attenuation.

Figure 1A:
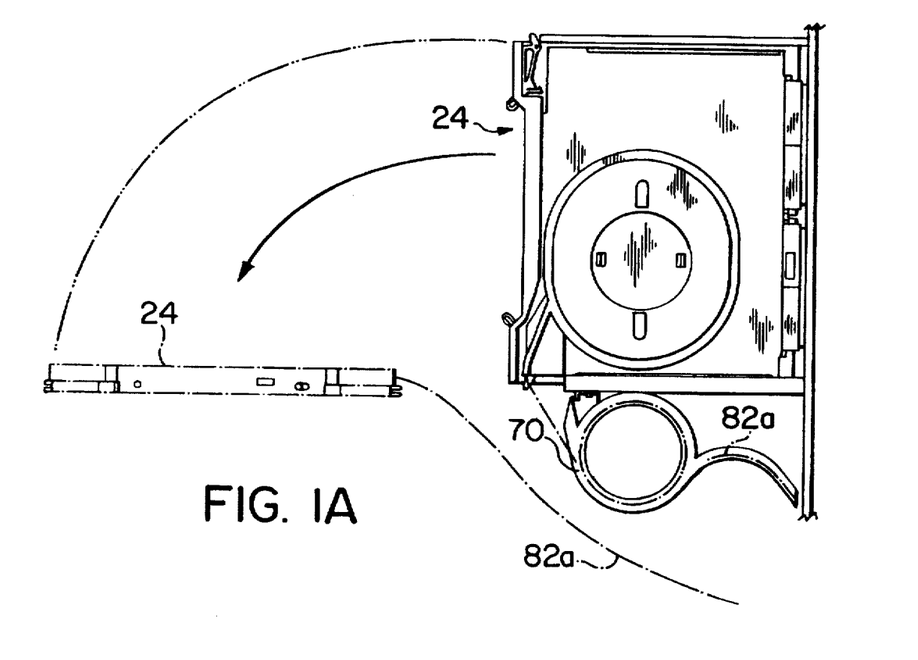
FIG. 1a is a diagrammatic view in the direction of FIG. 1 and showing movement of the printed circuit board between two positions.

As indicated above the number of convolutions within the pathway 38 for forming the superfluous length portion 82b, are dependent upon the amount of fiber necessary to pass it from the connector 44 to the other location 83 (see bottom of FIG. 1) while also providing sufficient fiber to form the removable length portion 82a. As shown by FIG. 1a, this length portion 82a must be of sufficient length to enable the arrangement 24 to be removed from within the shelf to be placed in a desirable position for maintenance, repair or replacement purposes. For instance, as shown in FIG. 1a, with the printed circuit board arrangement 24 removed and disposed upon a horizontal surface for work to be done, then the removable length portion 82a has previously been removed from the pathway 70 and is left hanging beneath the shelf during the removal time for the arrangement 24. Thus, the removable optical fiber portion 82a extends from beneath the shelf and is substantially protected from any damage with the arrangement 24 out from the shelf. Also the superfluous length 82b which is undisturbed within the holder 32 cannot suffer damage during removal or replacement of the arrangement 24.

As may be seen therefore, the invention and as described in this embodiment provides a convenient method of connecting an optical fiber into a printed circuit board for optical signal transmission. It also enables the accommodation of superfluous lengths of fiber where fiber has been manufactured in specific lengths which do not comply with the actual lengths required to extend from a connector on the printed circuit board to some other location. It also provides a removable length portion of fiber to enable freedom of movement of the printed circuit board into and out of the shelf, the superfluous and removable length portions of fiber being completely protected. In addition, with the removable length portion 82a being disposed away from the printed circuit board receiving chamber of the shelf, it is rendered extremely convenient for its removal from the holder 62 and, after removal, the portion 82a is protected beneath the shelf.

The construction described in FIGS. 1 and 1a is convenient for use in many designs of printed circuit board and shelf combinations. This is illustrated in second and third embodiment now to be described and in which elements similar to those described in the first embodiment will bear like reference numerals.

Figure 3:
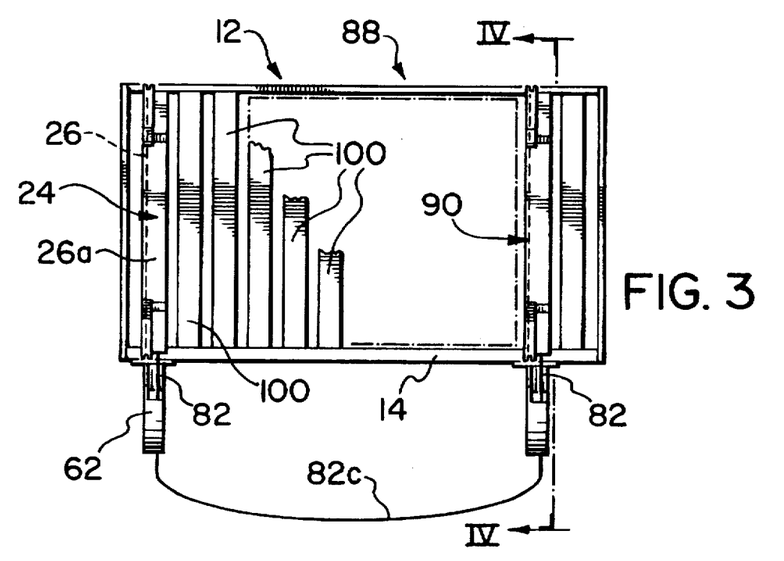
FIG. 3 is a front-elevational view of an electronic shelf and printed circuit board combination according to a second embodiment and to a smaller scale than that shown in FIG. 1.
Figure 4:
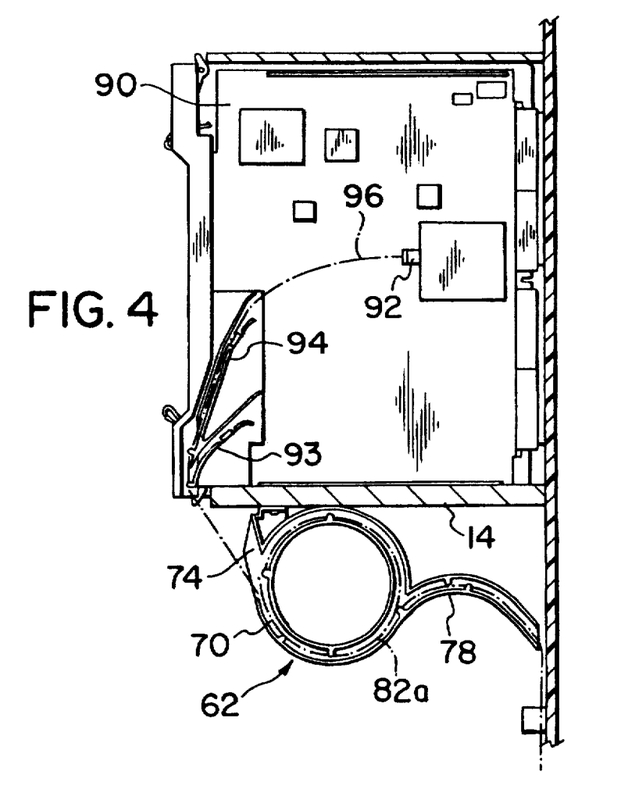
FIG. 4 is a cross-sectional view taken along line IV—IV in FIG. 3 of the combination of the second embodiment.

In the second embodiment, as shown in FIGS. 3 and 4, an electronic shelf and printed circuit board combination 88 comprises the shelf 12 having the printed circuit board arrangement 24 including the board 26 and face plate 26a and the fiber holder 32 as described in the first embodiment. It also includes the fiber storage facility 62 located directly beneath the arrangement 24 and beneath the bottom wall 14 of the shelf. With this combination of the second embodiment, the optical fiber 82 is to be directed to another printed circuit board 90 in the shelf. This printed circuit board 90 as shown by FIG. 4, has an optical fiber terminal 92 upon the face of the board and a guide 94 for the other end region 96 of the fiber 82. In addition, beneath the wall 14 and directly beneath the printed board 90 is located a further fiber storage facility 62 as described in the first embodiment for accommodating a further removable length 82a of the fiber which is fed through the guide 78, around the pathway 70 of that storage facility, and out through the entrance 74 to pass through the guide 94 to the connector 92. The board 92 has another guide 93 for fiber, but the guide 93 is not used in this embodiment.

As may be seen in use, the outgoing end 82c of the fiber extends at the rear of the shelf beneath the wall 14 from one fiber storage facility 62 to the other. It should also be noted that the printed circuit board 90 does not require the use of the holder 32 as for the printed circuit arrangement 24. This is because a single holder 32 is sufficient to accommodate all of the superfluous length of fiber which is not required for the path length between the two connectors 44 and 92. It should also be noted in this construction of the second embodiment the distance between the two fiber storage facilities 62 is sufficient to enable each removable fiber length portion 82a to be removed laterally from within its fiber storage facility. Hence it is expected that the printed circuit board arrangement 24 and the printed circuit board 90 should be substantially spaced apart, thus allowing for location of conventional printed circuit boards 100 (FIG. 3) between them and within the shelf.

Figure 5:
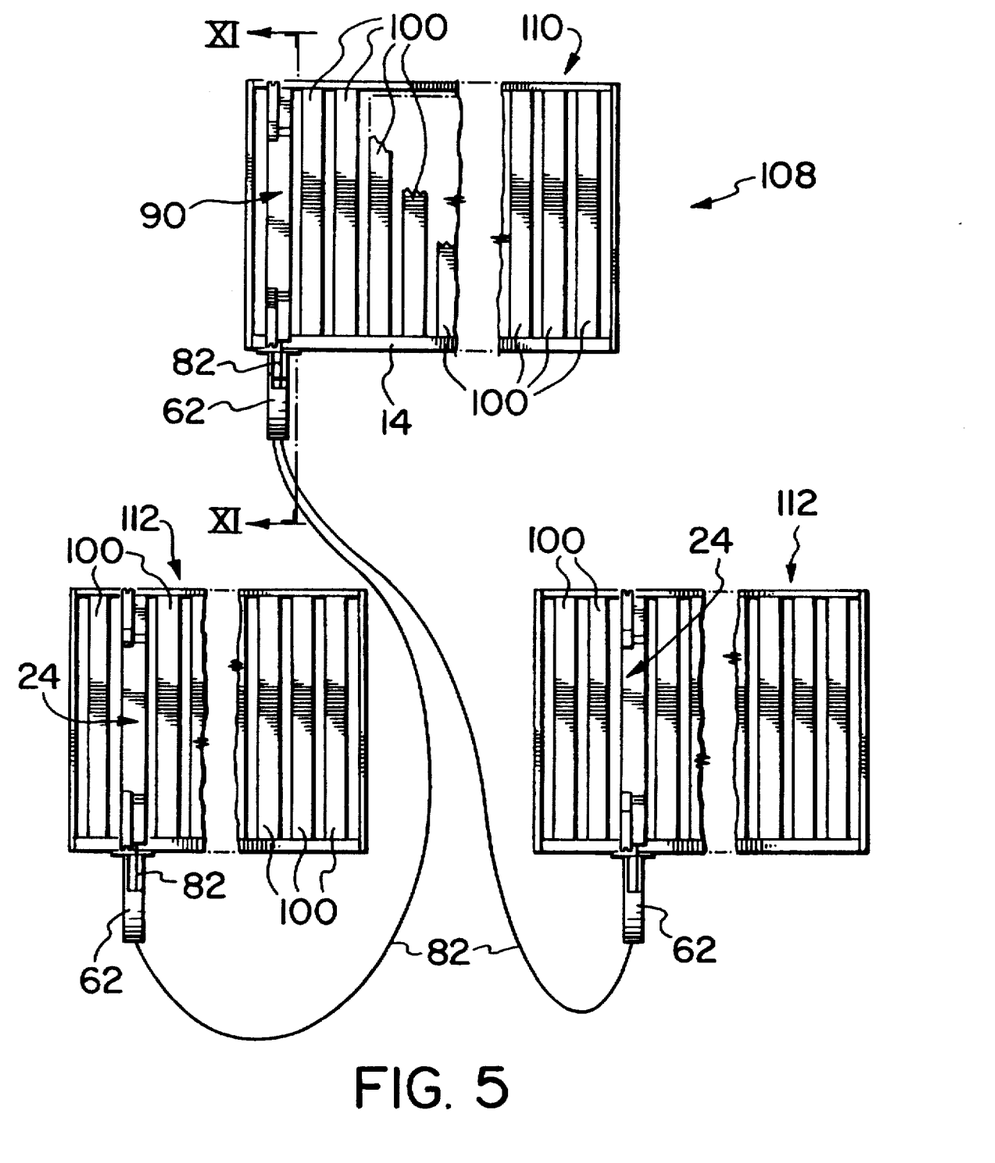
FIG. 5 is a front-elevational view of an electronic shelf and printed circuit board combination according to a third embodiment and to the scale of FIG. 3; and A
Figure 6:
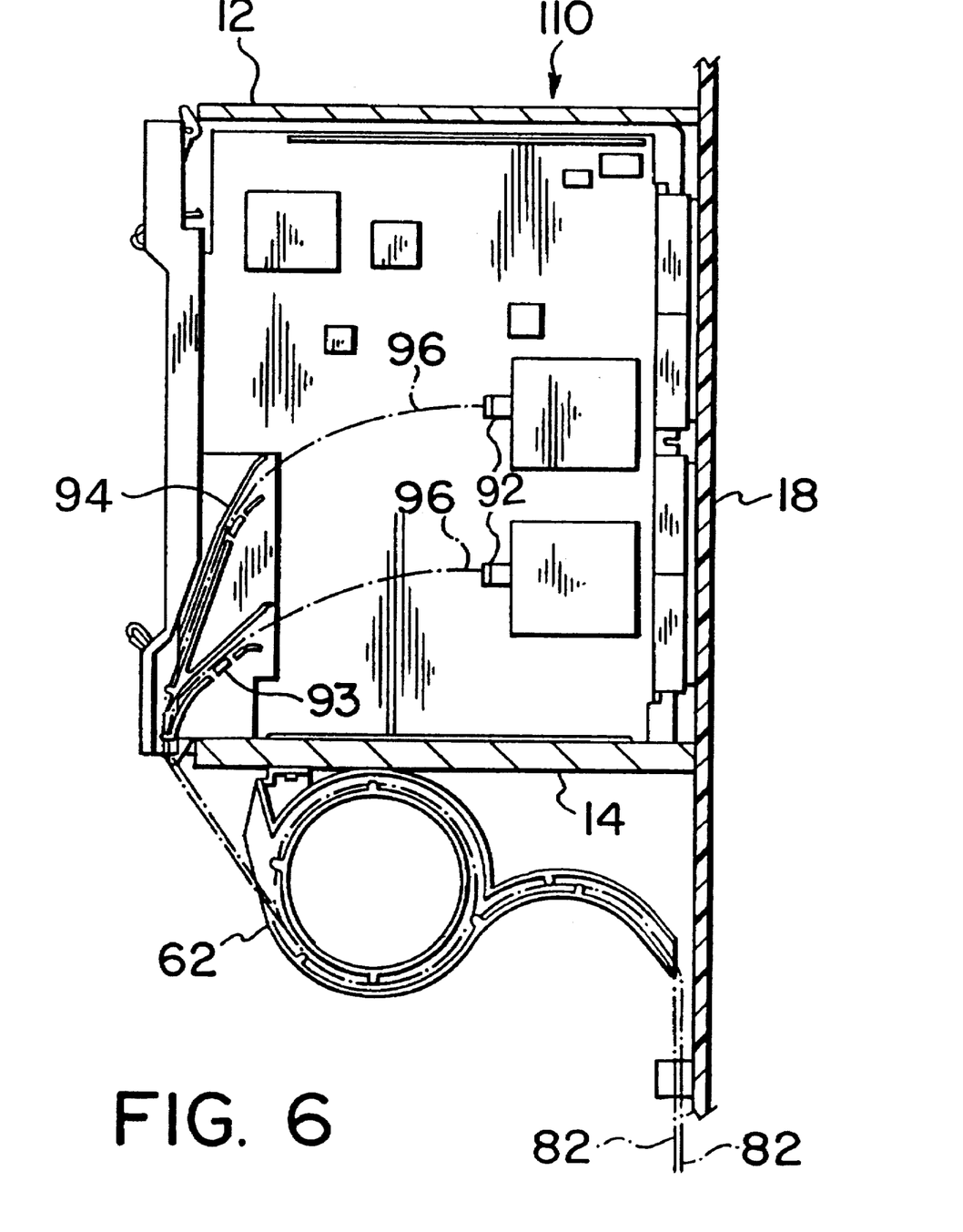
FIG. 6 is a cross-sectional view along line VI—VI in FIG. 5 of part of the combination of the third embodiment.

In a third embodiment as shown in FIG. 5, an electronic shelf and printed circuit board combination 108 comprises three separate shelves, namely a master shelf 110 and two slave shelves 112. Each slave shelf 112 accommodates conventional printed circuit boards 100 and at least one circuit board arrangement 24 with a corresponding fiber storage facility 62 disposed beneath each arrangement 24 and also beneath the bottom wall 14 of the shelf. Both of the arrangements 24 are slave arrangements. Within the master shelf 110 is accommodated a master printed circuit board 90 which has a corresponding fiber storage facility 62 disposed directly beneath it as in the second embodiment. As shown by FIG. 6 the master printed circuit board 90 has two optical connectors 92 each connected to an end portion 96 of an individual fiber 82. Each individual fiber end portion 96 is fed through an individual guide 94 and 93 and both fibers 82 extend from the printed circuit board 90 around the pathway within the fiber storage facility 62 associated with the master shelf 110. After exiting from the guide 78, each outgoing fiber length 82c extends to its own individual printed circuit board arrangement 24, passing firstly through the fiber storage facility 62 associated with that printed circuit board arrangement and as described with reference to FIG. 1.

As may be seen therefore the inventive concept using both a storage holder for superfluous length portions of fiber and a fiber storage facility for removable length portions may be used in many combinations of electronic shelves and printed circuit boards while obtaining the full advantages of the invention with regard to storage of the superfluous lengths and allowing for removability of the printed circuit boards from within the shelves without endangering the fiber which is required to be flexed and to be free during movement of the printed circuit boards.

What is claimed is:

1. An electronic shelf and printed circuit board combination comprising:

an electronic shelf defining a printed circuit board receiving chamber;

a printed circuit board received in an operational position within the printed circuit board receiving chamber;

a fiber storage holder mounted upon one side of the printed circuit board, the fiber storage holder defining an endless pathway for storing a superfluous length portion of fiber in the form of at least one convolution extending around the pathway, the holder providing a first inlet and a second inlet to the pathway for the fiber;

an optical connector carried by the printed circuit board for connection to a mating connector carried by a first end portion of the fiber extending from the first inlet;

a fiber storage facility disposed exteriorly of, and fixedly attached to, the printed circuit board receiving chamber, the fiber storage facility defining an endless fiber storage pathway for storing a removable length portion of the fiber in the form of at least one convolution, the fiber storage facility having means to allow for removal and insertion of the removable length portion of fiber from its storage pathway, and the fiber storage facility having a first entrance and a second entrance for fiber into its storage pathway with the first entrance oriented to receive fiber from the second inlet of the fiber storage holder, and the second entrance oriented to direct an outgoing length portion of the fiber from the storage facility to a further location.

2. A combination according to claim 1 wherein the means to allow for removal and insertion of the removable length portion of fiber is provided by an open side of the fiber storage facility.

3. A combination according to claim 2 wherein the fiber storage facility is carried upon a wall of the shelf beneath the printed circuit board receiving chamber.

4. A combination according to claim 1 wherein the fiber storage facility is carried upon a wall of the shelf.

5. A combination according to claim 1 wherein the second inlet of the fiber storage holder and the first entrance to the fiber storage facility are oriented to receive the fiber extending around a front edge of the shelf and between the second inlet and first entrance.

6. A combination according to claim 1 wherein at the further location, the combination comprises another printed circuit board disposed in an operational position and another fiber storage facility, the other fiber storage facility defining another endless fiber storage pathway for removably storing at least one convolution of part of the outgoing length portion of fiber, the other fiber storage facility having first and second openings for the fiber into the other endless fiber storage pathway, and the other printed circuit board carries another optical connector for connection to a mating connector on a second end portion of the fiber.

7. A combination according to claim 6 wherein the other printed circuit board has at least one guide for guiding the second end portion of the fiber to the first opening for the fiber.

8. A combination according to claim 6 comprising a further shelf and the other printed circuit board is disposed in its operational position within a printed circuit board receiving chamber in the further shelf, and the other fiber storage facility is mounted outwardly of the printed circuit board receiving chamber of the further shelf.

9. An electronic shelf and printed circuit board combination comprising:

a first electronic shelf defining a first printed circuit board receiving chamber and a first printed circuit board received in an operational position within the first chamber;

a second electronic shelf defining a second printed circuit board receiving chamber and a second printed circuit board received in an operational position within the second chamber, the first and second shelves providing a first pair of shelves;

a third electronic shelf defining a third printed circuit board receiving chamber and a third printed circuit board received in an operational position within the third chamber, the first and third shelves providing a second pair of shelves;

a fiber storage holder mounted upon one side of one of the printed circuit boards of each of the first and second pairs of shelves, the fiber storage holder defining an endless pathway for storing a superfluous length portion of fiber in the form of at least one convolution extending around the pathway, the holder providing a first inlet and a second inlet to the pathway for fiber;

an optical connector carried by each printed circuit board for connection to a mating connector carried by an end portion of fiber with, in the case of a printed circuit board carrying a fiber storage holder, the first inlet is oriented to direct fiber to the optical connector of that printed circuit board;

a fiber storage facility disposed externally of, and fixedly attached to, each printed circuit board receiving chamber, each fiber storage facility defining an endless fiber storage pathway for storing a removable length portion of fiber in the form of at least one convolution and having means to allow for removal and insertion of the removable length portion from its storage pathway and having a first entrance and a second entrance for fiber into its storage pathway with, in the case of a printed circuit board carrying a fiber storage holder, the first entrance is oriented to receive fiber from the second inlet of the fiber storage holder and the second entrances of the fiber storage facilities are oriented to enable a fiber to extend between second entrances of the fiber storage facilities of each pair of shelves and the fiber storage facility of the first shelf is operable to simultaneously contain at least one removable length portion of each fiber.

10. A combination according to claim 9 wherein a fiber storage holder is mounted upon one side of each of the second and third printed circuit boards.

* * * * *